US009623713B2

(12) United States Patent
Wolf-Monheim

(10) Patent No.: US 9,623,713 B2
(45) Date of Patent: Apr. 18, 2017

(54) DAMPING DEVICE WITH ADJUSTABLE SPRING RATE

(71) Applicant: FORD GLOBAL TECHNOLOGIES, LLC, Dearborn, MI (US)

(72) Inventor: Friedrich Peter Wolf-Monheim, Aachen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/157,406

(22) Filed: Jan. 16, 2014

(65) Prior Publication Data

US 2014/0197586 A1 Jul. 17, 2014

(30) Foreign Application Priority Data

Jan. 17, 2013 (DE) .................. 10 2013 200 626

(51) Int. Cl.
*B60G 17/027* (2006.01)
*B60G 15/06* (2006.01)
(Continued)

(52) U.S. Cl.
CPC ............ *B60G 15/065* (2013.01); *B60G 11/52* (2013.01); *B60G 17/027* (2013.01); *B60G 17/08* (2013.01);
(Continued)

(58) Field of Classification Search
CPC .... F16F 1/3615; F16F 3/10; F16F 3/12; F16F 13/005; F16F 13/007; B60G 17/02; B60G 17/021; B60G 17/027; B60G 17/0272
See application file for complete search history.

(56) References Cited

U.S. PATENT DOCUMENTS 4,159,105 A * 6/1979 Vander Laan et al. ....... 267/218
5,133,573 A * 7/1992 Kijima .................. B60G 15/068
267/220
(Continued)

FOREIGN PATENT DOCUMENTS

CN 1810530 A 8/2006
DE 102004032083 A1 1/2006
(Continued)

OTHER PUBLICATIONS

English-language abstract of JP 04-347024 (no date).*
(Continued)

*Primary Examiner* — Nicholas J Lane
(74) *Attorney, Agent, or Firm* — Jones Robb, PLLC; Raymond L. Coppiellie

(57) ABSTRACT

A spring and damping device for a wheel suspension in motor vehicles includes an upper region, a lower region, and a damping element arranged between the upper region and the lower region. The device further includes a coil spring element and a rubber spring element. The coil spring element and the rubber spring element are arranged one behind the other along a center axis of the damping element such that the coil spring element is positioned to exert a force on the rubber spring element. The device allows a spring rate to be adjusted based either on sensed conditions, or by driver input. The spring rate may be adjustable between discrete settings or continuously variable.

13 Claims, 2 Drawing Sheets

(51) Int. Cl.
*F16F 1/36* (2006.01)
*B60G 17/08* (2006.01)
*B60G 11/52* (2006.01)
*F16F 1/12* (2006.01)

(52) U.S. Cl.
CPC ............ *F16F 1/121* (2013.01); *F16F 1/3615* (2013.01); *B60G 2202/12* (2013.01); *B60G 2202/14* (2013.01); *B60G 2202/24* (2013.01); *B60G 2204/124* (2013.01); *B60G 2204/125* (2013.01)

(56) References Cited

U.S. PATENT DOCUMENTS

| | | | | |
|---|---|---|---|---|
| 5,813,501 | A | * | 9/1998 | Terry, Sr. ...................... 188/344 |
| 7,021,435 | B2 | * | 4/2006 | Lisenker et al. ......... 188/322.22 |
| 8,256,589 | B2 | * | 9/2012 | Seidl ...................... 188/322.16 |
| 2002/0171187 | A1 | * | 11/2002 | Becker ............... B60G 17/0272 267/218 |
| 2004/0154888 | A1 | | 8/2004 | Lisenker et al. |
| 2010/0230878 | A1 | * | 9/2010 | Seidl ...................... B60G 11/52 267/220 |

FOREIGN PATENT DOCUMENTS

| | | | | |
|---|---|---|---|---|
| DE | 102007007630 | A1 | | 8/2008 |
| DE | 102008047023 | | * | 3/2010 ............ F16F 1/3615 |
| JP | 04347024 | A | * | 12/1992 ................ F16F 9/46 |

OTHER PUBLICATIONS

Machine translation of DE 102008047023 (no date).*
Examination Report issued in corresponding German Patent Application No. 102013200626.8, dated Oct. 10, 2013.
Notification of First Office Action for related Chinese Patent Application No. 201410019970.6, dated Jan. 4, 2017, with an English Translation.

* cited by examiner

DAMPING DEVICE WITH ADJUSTABLE SPRING RATE

CROSS REFERENCE TO RELATED APPLICATIONS

This application claims priority to German Application No. 102013200626.8, filed on Jan. 17, 2013, the entire content of which is incorporated by reference herein.

TECHNICAL FIELD

The present disclosure relates generally to a spring and damping device and method of operating the device. In particular, the present disclosure relates to a spring and damping device for a wheel suspension in a motor vehicle and a method of operating the device.

BACKGROUND

Conventional passive suspension systems for motor vehicles usually allow the user only one spring setting.

It may be desirable to provide a suspension system, such as a vehicle suspension system, with multiple spring settings to increase driving comfort and to allow a change in spring rate during travel in order to, for example, adapt to changes in a road surface.

SUMMARY

In accordance with various exemplary embodiments, the present disclosure provides a spring and damping device for a wheel suspension in motor vehicles. The device comprises an upper region, a lower region, and a damping element arranged between the upper region and the lower region. The damping element has a center axis. A coil spring element and a rubber spring element are arranged one behind the other along the center axis of the damping element such that the coil spring element is positioned to exert a force on the rubber spring element.

In accordance with another aspect of the present disclosure, a motor vehicle comprises a suspension system including a spring and damping device having an upper region, a lower region, and a damping element arranged between the upper region and the lower region. The damping element has a center axis. A coil spring element and a rubber spring element are arranged one behind the other along the center axis of the damping element such that the coil spring element is positioned to exert a force on the rubber spring element.

In accordance with a further aspect of the present disclosure, a method of adjusting a spring rate in a suspension of a motor vehicle is provided. The method comprises receiving an input indicative of a desired spring rate, adjusting a pressure of at least one fluid in a spring and damping device of the suspension based on the input, and increasing or decreasing a force exerted by the device based on the change in the pressure.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Figure 1:
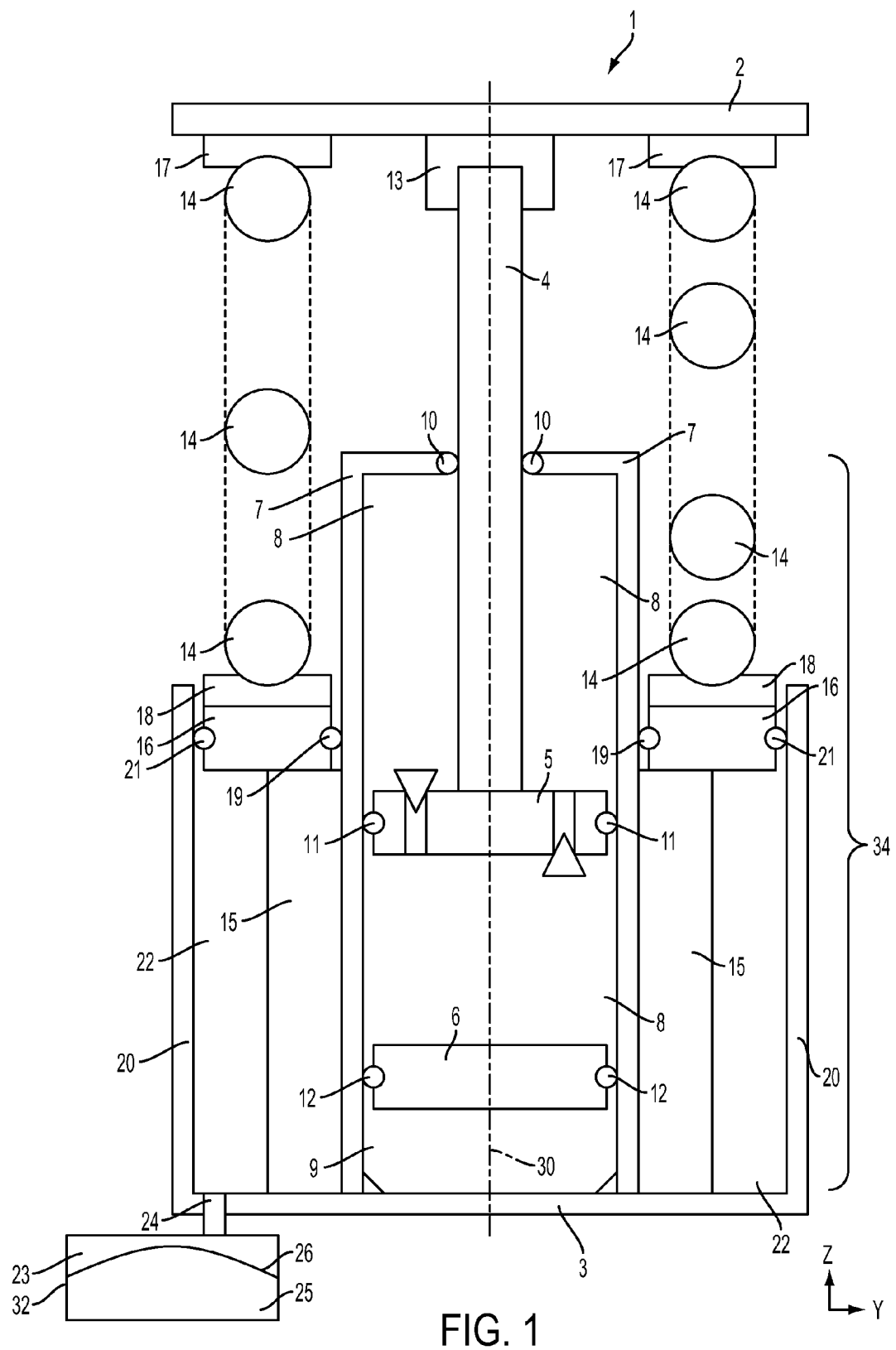
FIG. 1 is a longitudinal cross section of a spring and damping device having a first spring rate in accordance with the present disclosure.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a spring and damping device for a wheel suspension in a motor vehicle may be a spring strut and/or a shock absorber. An exemplary embodiment of a spring and damping device for a wheel suspension in a motor vehicle includes an upper region, a lower region and a damping element with a center axis. The damping element is arranged between the upper region and the lower region. The damping element may include, for example, a piston rod, a piston and a cylinder tube. The upper region and/or lower region can, for example, be formed as plates.

In accordance with the present teachings, an exemplary embodiment of a spring and damping device may further include a coil spring element and a rubber spring element. The coil spring element and the rubber spring element may be arranged one behind the other in the axial direction along the center axis of the damping element so that a force can be exerted on the rubber spring element by means of the coil spring element. For example, the coil spring element and the rubber spring element can be arranged coaxially, one behind the other in the axial direction such that the coil spring element can be pressed directly or indirectly against the rubber spring element. The coil spring element and/or the rubber spring element may be arranged around the damping element. In one exemplary embodiment, the coil spring element and/or the rubber spring element are arranged concentrically relative to the damping element.

The use of a rubber spring element, in addition to a coil spring, has the advantage that settings for the spring constant and/or damping constant can be adjusted during travel. For example, a switchable spring and damping system with two different spring and damping constants can be achieved. This increases the driving comfort of the motor vehicle substantially, since for example a soft spring setting can be used on mainly straight roads with uneven surface and a hard spring setting can be used on twisty roads to improve the road-holding and controllability of the motor vehicle.

The rubber spring element can be arranged inside a first volume. Here the first volume can be filled with a first fluid, for example, a liquid or a gas. In one exemplary embodiment, the first fluid is a hydraulic fluid.

A volume in the context of the present disclosure means a cavity. The cavity can be designed such that it can be filled with fluid.

For example, the first volume can be designed in the form of a cylinder, in particular a hollow cylinder. In an exemplary embodiment of a spring and damping device in accordance with the present disclosure, the pressure of the first fluid in the first volume can be adjustable or variable. In this way the damping effect of the rubber spring element or the influence of the rubber spring element on the total spring rate can be influenced.

In addition, the first volume can be connected fluidically to a second volume. In particular the first volume can be connected to the second volume such that the first fluid, i.e., the fluid from the first volume, can flow at least partially into and out of the second volume. In addition, the second volume can be filled at least partly with a second fluid, for example, a liquid or a gas.

In accordance with one aspect of the disclosure, an exemplary embodiment of a spring and damping device may include a device for setting the pressure of the first fluid and/or a device for setting the pressure of the second fluid. To vary the pressure of the first fluid and/or the second fluid, an electrically operated hydraulic fluid or gas pump can be used. By setting the pressure of the first or second fluid, the deformability and damping effect or spring rate of the rubber spring element can be influenced and, at the same time, adjusted. In principle the first fluid and/or the second fluid can be a gas or a liquid, for example a hydraulic fluid.

The second volume can comprise a membrane. The membrane can, for example, be arranged between the first fluid and the second fluid. The spring and damping device may be designed such that the pressure of the second fluid can be adjusted.

In one exemplary embodiment, a valve such as, for example, a hydraulic valve, can be arranged between the second volume and the first volume. In this way the pressure set in the first volume of the first fluid can be fixed. The valve can thus be used as a device for adjusting the pressure of the first fluid.

In principle, an annular component may be arranged between the coil spring element and rubber spring element. The annular component may be arranged inside the first volume or at least partially inside the first volume. Also, the annular component can include seals which prevent the escape of the first fluid from the first volume. In addition, a stop buffer or stop element can be arranged between the annular component and the coil spring element. A stop buffer or a corresponding support also can be arranged between the coil spring element and the upper region of the spring and damping device.

In accordance with another exemplary embodiment of the present teachings, a motor vehicle may include a spring and damping device as described above.

In accordance with the present teachings, in an exemplary method of operating a spring and damping device as described above, the pressure of the first fluid in the first volume is controlled as a function of a parameter. For example, the pressure of the first fluid in the first volume can be controlled in that the pressure of the second fluid, for example in the second volume, is controlled. Here for example the first fluid can be a hydraulic fluid and the second fluid a gas. The hydraulic fluid and the gas may be separated from each other by a membrane. The membrane may be located inside the second volume. By adjusting the pressure of the gas (second fluid in the second volume), an outflow of hydraulic fluid from the first volume to the second volume can be allowed or prevented. This in turn has an effect on the spring rate of the rubber spring element and hence on the total spring rate of the spring and damping device. The pressure can be set either automatically driven by a particular driving condition or manually based on a driver input via a human machine interface (HMI). The pressure level can go up to 200 bar.

In principle the pressure of the first fluid and/or the pressure of the second fluid can be set as a function of the composition of the road surface or as a function of the driver's wishes. In the case where the system is controlled automatically based on sensor input signals, the system can be switched between settings. For example, set to a soft setting while driving straight ahead on uneven road surfaces and set to a stiff setting while driving on winding roads. In the case where the system is controlled manually via a HMI, the driver can choose between different settings (e.g., comfort, normal, and sport). In accordance with one exemplary embodiment of the method, at least two different pressure values of the first fluid and/or of the second fluid can be set. Additionally, it is possible to switch between the at least two different pressure values to change the spring rate.

Compared with conventional damping systems, the spring and damping device according to the present disclosure with its adjustable total spring rate has the advantage that it is possible to switch from a hard to a soft spring setting and from a soft to a hard spring setting during operation of the motor vehicle. This substantially improves driving comfort and allows the suspension properties of the vehicle to be adapted to the composition of the road surface, the driver's wishes or other relevant parameters. Additionally, the system can be controlled in a way that it works basically in automatic mode and can overridden by the driver's input via the HMI.

Figure 2:
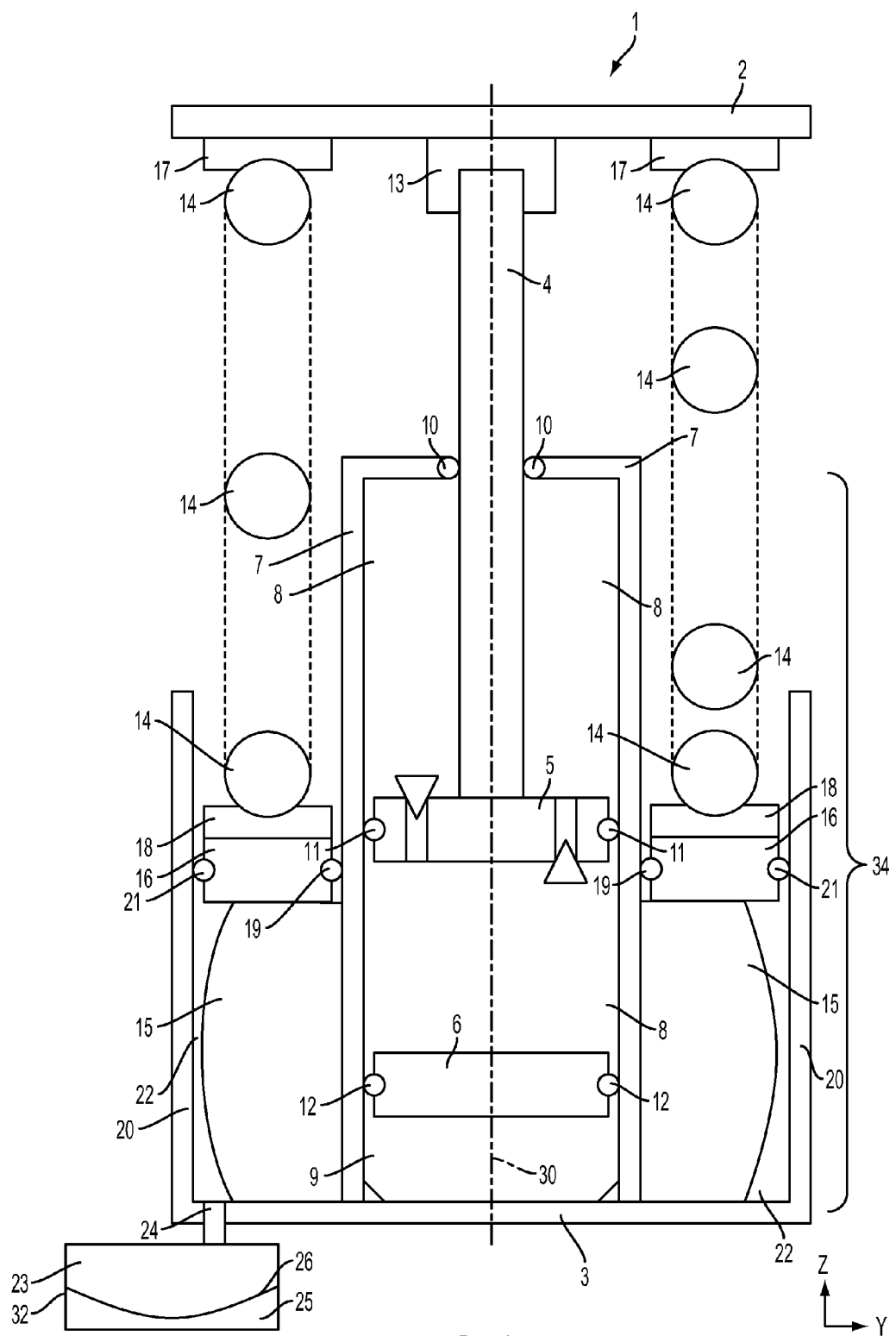
FIG. 2 is a longitudinal cross section of a spring and damping device having a second, different spring rate from that illustrated in FIG. 1, in accordance with the present disclosure.

FIG. 1 illustrates a spring and damping device in accordance with the present teachings, where the device is set at a first total spring rate and FIG. 2 illustrates a spring and damping device in accordance with the present teachings, where the device is set at a second total spring rate different from the first total spring rate. FIG. 1 shows a longitudinal cross section of a spring and damping device set, in accordance with the present teachings, for hard springing, i.e. with a high total spring rate. The spring rates can vary depending on the particular vehicle application as well as the individual motion ratio between the spring travel and the wheel travel. For passenger cars typical spring rates can range between 15 and 150 N/mm. A typical spread between a soft and a hard spring rate would be a factor of 2 to 5. FIG. 2 shows a longitudinal cross section of the spring and damping device shown in FIG. 1 when set for soft springing, i.e., with a low total spring rate. In FIGS. 1 and 2, the z axis designates the direction of the longitudinal axis or the axial direction of the spring and damping device. The y axis designates the radial direction.

As illustrated in FIG. 1, an exemplary embodiment of a spring and damping device 1 is arranged between an upper plate 2 and a lower plate 3. Spring and damping device 1 includes a center (longitudinal) axis 30. A damping element 34 is arranged in the middle of the spring and damping device 1, i.e., in the region of the center axis 30.

The damping element 34 comprises a center axis 30 which coincides with the center axis 30 of the spring and damping device 1, a piston rod 4, a piston with a valve device 5, a cylinder tube 7 and an intermediate piston 6. A cavity or volume 8 in the interior of the cylinder 7 is filled with a hydraulic fluid. A cavity or volume 9 between the intermediate piston 6 and the floor of the cylinder (the lower plate 3) is filled with a pressurized gas in order to prevent cavitation in the cavity 8.

Sealing elements 11 are arranged between the cylinder tube 7 and the valve device 5. Seals 10 are arranged between the piston rod 4 and the cylinder tube 7 in order to prevent an escape of hydraulic fluid from the volume 8. A contact surface between the intermediate piston 6 and the cylinder tube 7 is sealed using sealing elements 12. The piston rod 4 is separated from the upper plate 2 by means of a spacer element or spacer 13 which prevents a direct contact of the piston rod 4 on the upper plate 2. The element 13 can have isolating properties.

A coil spring element 14 and a rubber spring element 15 are arranged behind each other along the center axis 30 and concentrically around the damping element 34. An annular element 16 is arranged between the coil spring element 14 and the rubber spring element 15. The element 16 is made, for example, out of a metal material to enable an adequate sealing functionality between the cavity 22 and the environment. The coil spring element 14 is separated from the upper plate 2 by means of an upper spring pad or stop element 17, and from the annular element 16 by means of a lower spring pad or stop element 18. The stop elements 17 and 18 are made, for example, out of rubber. Typically the stop elements 17 and 18 are less thick compared to the annular element 16 and are shaped in a way that the coil spring element 14 is sufficiently centered relative to the center axis 30.

A contact surface between the annular element 16 and the cylinder tube 7 is sealed by means of seals 19. The contact surface between the annular element 16 and an outer tube element or outer cylinder 20 is sealed by means of seals 21. The volume or cavity 22 between the outer cylinder or outer tube element 20 and the rubber spring element 15 is filled with a fluid. The cavity 22 is connected to a cavity 23. For example a fluid channel 24 can be arranged between the volume 22 and the volume 23. The connection between the volume 22 and the volume 23 can be opened or closed for example by means of a hydraulic valve element (not shown).

A volume 25 is adjacent to the volume 23. The volume 23 and the volume 25 together form a second volume 32 in accordance with the present teachings while the first volume in accordance with the present teachings is formed by the volume 22. Usually the size of the volume 22 is similar to the size of the volume 32. The membrane 26 can be made from, for example, an elastic plastic material with a thin wall thickness. Volume 25 is filled with a pressurizable gas (second fluid). A membrane 26, which separates the hydraulic fluid and the gas from each other, is arranged between the volume 23 which in the present exemplary embodiment, like the volume 22, is filled with a hydraulic fluid (first fluid).

Alternatively the first fluid can be a gas and the second fluid a liquid, for example, a hydraulic fluid.

The total spring rate of the spring and damping device 1 can be set and influenced by changing the pressure of the gas in the volume 25. In the case of a high gas pressure in the volume 25, the total spring rate is set such that a hard springing is achieved, since the hydraulic fluid is pressed by the second volume 23 into the first volume 22 and hence the rubber spring element 15 cannot be compressed by the force effect of the coil spring element 14. The rubber spring element 15 is therefore relatively stiff. This is shown in FIG. 1. The gas pressure in volume 25 can be varied with a connected compressed air pump during operation of the vehicle. The spring rate variation can be implemented in three different ways. The first alternative is a dual rate approach with two settings, a stiff spring rate and a soft spring rate. The second alternative allows additional discrete spring rate settings between the minimum and the maximum setting, for example, 5 to 7 different settings. The third alternative is to implement a continuously variable spring rate achieved by a continuously variable gas pressure in volume 25.

In the case of a low gas pressure in the volume 25, a soft springing is set in the spring and damping device 1 since the hydraulic fluid can flow to and fro between the first volume 22 and the second volume 23. Compression of the rubber spring element 15 under the force effect of the coil spring element 14 is thus possible. This achieves a soft springing.

FIG. 1 shows the case of hard springing, i.e. a high pressure of the gas in the volume 25. FIG. 2 shows the case of a soft springing, i.e. a low pressure of the gas in the volume 25. FIG. 2 shows the rubber spring element 15 in a compressed i.e. deformed form.

While the present disclosure has been disclosed in terms of exemplary embodiments in order to facilitate better understanding of the present disclosure, it should be appreciated that the present disclosure can be embodied in various ways without departing from the principle of the disclosure. Therefore, the present disclosure should be understood to include all possible embodiments which can be embodied without departing from the principle of the disclosure set out in the appended claims.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A spring and damping device comprising:
a damping element having a center axis;
a coil spring element, an annular component, and a rubber spring element arranged one behind the other in a direction extending parallel to the center axis, the rubber spring element being arranged inside a first volume configured to contain a first fluid, and the coil spring element being positioned to exert a force on the rubber spring element via the annular component;
a second volume fluidically connected to the first volume, the second volume being at least partially filled with a second fluid, wherein at least a portion of the first fluid can flow into and out of the second volume; and
a device for controlling an amount of the first fluid in the first volume,
wherein the annular component is separated from the coil spring element by a rubber stop element, and
wherein the first fluid, when present, supports at least a portion of the rubber spring element in a radial direction relative to the center axis, and
wherein controlling an amount of the first fluid in the first volume controls a spring rate of the spring and damping device.

2. The spring and damping device as claimed in claim 1, wherein decreasing the amount of the first fluid in the first volume adjusts a spring rate of the rubber spring element.

3. The spring and damping device as claimed in claim 2, further comprising a device for setting the pressure of the first fluid and/or a device for setting the pressure of the second fluid.

4. The spring and damping device as claimed in claim 2, wherein at least one of the first fluid and the second fluid is a liquid.

5. The spring and damping device as claimed in claim 4, wherein at least one of the first fluid and the second fluid is a gas.

6. The spring and damping device as claimed in claim 1, wherein the second volume comprises a membrane.

7. The spring and damping device as claimed in claim 1, wherein a valve is arranged between the second volume and the first volume.

8. The spring and damping device as claimed in claim 1, wherein the spring and damping device forms a spring strut and/or shock absorber in a suspension system of a motor vehicle.

9. The spring and damping device as claimed in claim 1, wherein the spring rate of the spring and damping device is adjustable based on at least one of sensed conditions and driver input.

10. The spring and damping device as claimed in claim 1, wherein the spring rate of the spring and damping device is adjustable between discrete settings.

11. A spring and damping device, comprising:
a coil spring element and a rubber spring element arranged one behind the other in a direction extending parallel to a center axis of the device, the rubber spring element being contained in a first volume of the spring and damping device;
a second volume in fluid communication with the first volume, the second volume configured to control a pressure of the first fluid in the first volume via a pressure of a second fluid contained in the second volume; and
a total spring rate adjustment device configured to set a desired total spring rate by adjusting an amount of a first fluid in the first volume to vary a spring rate of the rubber spring element, the first fluid supporting at least a portion of a radial surface of the rubber spring element,
wherein the coil spring element is configured to exert a force on the rubber spring element based on the desired total spring rate.

12. The spring and damping device as claimed in claim 11, wherein the fluid pressure of the first fluid and/or a fluid pressure of a second fluid is set as a function of a composition of a road surface.

13. The spring and damping device as claimed in claim 1, wherein the amount of first fluid in the first volume controls an amount of deflection of the rubber spring element in the radial direction.

* * * * *